(12) United States Patent
Pekar et al.

(10) Patent No.: US 10,503,128 B2
(45) Date of Patent: Dec. 10, 2019

(54) APPROACH AND SYSTEM FOR HANDLING CONSTRAINTS FOR MEASURED DISTURBANCES WITH UNCERTAIN PREVIEW

(71) Applicant: Honeywell spol. s.r.o., Morris Plains, NJ (US)

(72) Inventors: Jaroslav Pekar, Pacov (CZ); Jaroslav Beran, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 47 days.

(21) Appl. No.: 15/005,406

(22) Filed: Jan. 25, 2016

(65) Prior Publication Data
US 2016/0216699 A1    Jul. 28, 2016

(30) Foreign Application Priority Data

Jan. 28, 2015 (EP) ..................... 15152957

(51) Int. Cl.
*G05B 13/04* (2006.01)
*F02D 29/02* (2006.01)

(52) U.S. Cl.
CPC ........... *G05B 13/048* (2013.01); *F02D 29/02* (2013.01)

(58) Field of Classification Search
CPC ........... G05B 13/048; F02D 2041/1433; F02D 2041/1412; F02D 41/005; F02D 41/1401; F02D 11/105; F02D 13/02; F02D 41/263
See application file for complete search history.

(56) References Cited

U.S. PATENT DOCUMENTS

| 3,744,461 A | 7/1973 | Davis |
| 4,005,578 A | 2/1977 | McInerney |
| 4,055,158 A | 10/1977 | Marsee |

(Continued)

FOREIGN PATENT DOCUMENTS

| CN | 102063561 | 5/2011 |
| CN | 102331350 | 1/2012 |

(Continued)

OTHER PUBLICATIONS https://www.dieselnet.com/standards/us/obd.php, "Emission Standards: USA: On-Board Diagnostics," 6 pages, printed Oct. 3, 2016.

(Continued)

*Primary Examiner* — Joseph J Dallo
*Assistant Examiner* — Kurt Philip Liethen
(74) *Attorney, Agent, or Firm* — Seager, Tufte & Wickhem, LLp

(57) ABSTRACT

An approach and system for robust constraints handling for measured disturbances with uncertain preview on a prediction horizon in model predictive control with application in automotive control systems A constraints handling system may incorporate a mechanism for measuring disturbances of automotive control subsystems, a model predictive controller that provides model predictive control, connected to the a mechanism for measuring disturbances, and a sensor subsystem that collects information about an uncertainty of measured disturbances. The disturbances may have an uncertain preview over a prediction horizon. Estimates for the disturbances may be made of the preview.

13 Claims, 10 Drawing Sheets

(56) References Cited

U.S. PATENT DOCUMENTS

| | | |
|---|---|---|
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamei et al. |
| 4,671,235 A | 6/1987 | Hosaka |
| 4,677,559 A | 6/1987 | Van Bruck |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Gruffer et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A * | 4/1998 | Wassick ............... G05B 13/048 700/29 |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong |
| 6,048,628 A | 4/2000 | Hillmann et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Fruedenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,724 B1 | 11/2001 | Kakuyama et al. |
| 6,321,538 B2 | 11/2001 | Hasler |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,203 B1 | 5/2002 | Jordan et al. |
| 6,389,803 B1 | 5/2002 | Surnilla et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 10/2002 | Asik et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,546,329 B2 | 4/2003 | Bellinger |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |

(56) References Cited

U.S. PATENT DOCUMENTS

| | | | |
|---|---|---|---|
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Surnilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,839,637 B2 | 1/2005 | Moteki et al. |
| 6,849,030 B2 | 2/2005 | Yamamoto et al. |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 * | 3/2006 | Bowyer .............. F02D 41/0007 701/108 |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,067,319 B2 | 6/2006 | Wills et al. |
| 7,069,903 B2 | 7/2006 | Surnilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Surnilla |
| 7,111,455 B2 | 9/2006 | Okugawa et al. |
| 7,113,835 B2 | 9/2006 | Boyden et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,383,118 B2 | 6/2008 | Imai et al. |
| 7,389,773 B2 | 6/2008 | Stewart et al. |
| 7,392,129 B2 | 6/2008 | Hill et al. |
| 7,398,082 B2 | 7/2008 | Schwinke et al. |
| 7,398,149 B2 | 7/2008 | Ueno et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,474,953 B2 | 1/2009 | Hulser et al. |
| 7,493,236 B1 | 2/2009 | Mock et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,542,842 B2 | 6/2009 | Hill et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,226 B2 | 10/2009 | Henein |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |

(56) References Cited

U.S. PATENT DOCUMENTS

| | | | |
|---|---|---|---|
| 7,698,004 B2 | 4/2010 | Boyden et al. |
| 7,702,519 B2 | 4/2010 | Boyden et al. |
| 7,725,199 B2 | 5/2010 | Brackney |
| 7,734,291 B2 | 6/2010 | Mazzara, Jr. |
| 7,743,606 B2 | 6/2010 | Havlena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Youzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,861,518 B2 | 1/2011 | Federle |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,904,280 B2 | 3/2011 | Wood |
| 7,905,103 B2 | 3/2011 | Larsen et al. |
| 7,907,769 B2 | 3/2011 | Sammak et al. |
| 7,930,044 B2 | 4/2011 | Attarwala |
| 7,933,849 B2 | 4/2011 | Bartee et al. |
| 7,958,730 B2 | 6/2011 | Stewart et al. |
| 7,987,145 B2 | 7/2011 | Baramov |
| 7,996,140 B2 | 8/2011 | Stewart et al. |
| 8,001,767 B2 | 8/2011 | Kakuya et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsari |
| 8,046,089 B2 | 10/2011 | Renfro et al. |
| 8,060,290 B2 | 11/2011 | Stewart et al. |
| 8,078,291 B2 | 12/2011 | Pekar et al. |
| 8,109,255 B2 | 2/2012 | Stewart et al. |
| 8,121,818 B2 | 2/2012 | Gorinevsky |
| 8,145,329 B2 * | 3/2012 | Pekar | G05B 13/048 700/44 |
| 8,209,963 B2 | 7/2012 | Kesse et al. |
| 8,229,163 B2 | 7/2012 | Coleman et al. |
| 8,265,854 B2 | 9/2012 | Stewart et al. |
| 8,281,572 B2 | 10/2012 | Chi et al. |
| 8,295,951 B2 * | 10/2012 | Crisalle | G05B 13/048 700/29 |
| 8,311,653 B2 | 11/2012 | Zhan et al. |
| 8,312,860 B2 | 11/2012 | Yun et al. |
| 8,360,040 B2 | 1/2013 | Stewart et al. |
| 8,379,267 B2 | 2/2013 | Mestha et al. |
| 8,396,644 B2 | 3/2013 | Kabashima et al. |
| 8,453,431 B2 | 6/2013 | Wang et al. |
| 8,473,079 B2 | 6/2013 | Havlena |
| 8,478,506 B2 | 7/2013 | Grichnik et al. |
| RE44,452 E * | 8/2013 | Stewart | F02D 41/0007 123/198 F |
| 8,504,175 B2 * | 8/2013 | Pekar | G05B 13/048 700/29 |
| 8,505,278 B2 | 8/2013 | Farrell et al. |
| 8,543,170 B2 | 9/2013 | Mazzara, Jr. et al. |
| 8,543,362 B2 | 9/2013 | Germann et al. |
| 8,555,613 B2 | 10/2013 | Wang et al. |
| 8,596,045 B2 | 12/2013 | Tuomivaara et al. |
| 8,620,461 B2 | 12/2013 | Kihas |
| 8,649,884 B2 | 2/2014 | MacArthur et al. |
| 8,649,961 B2 | 2/2014 | Hawkins et al. |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,813,690 B2 | 8/2014 | Kumar et al. |
| 8,892,221 B2 | 11/2014 | Kram et al. |
| 8,899,018 B2 | 12/2014 | Frazier et al. |
| 8,904,760 B2 | 12/2014 | Mital |
| 9,170,573 B2 | 10/2015 | Kihas |
| 9,223,301 B2 | 12/2015 | Stewart et al. |
| 9,253,200 B2 | 2/2016 | Schwarz et al. |
| 2002/0112469 A1 | 8/2002 | Kanazawa et al. |
| 2002/0116104 A1 | 8/2002 | Kawashima et al. |
| 2003/0089102 A1 | 5/2003 | Colignon et al. |
| 2003/0150961 A1 | 8/2003 | Boelitz et al. |
| 2004/0006973 A1 | 1/2004 | Makki et al. |
| 2004/0034460 A1 | 2/2004 | Folkerts et al. |
| 2004/0086185 A1 | 5/2004 | Sun |
| 2004/0117766 A1 | 6/2004 | Mehta et al. |
| 2004/0118107 A1 | 6/2004 | Ament |
| 2004/0144082 A1 | 7/2004 | Mianzo et al. |
| 2004/0165781 A1 | 8/2004 | Sun |
| 2004/0199481 A1 | 10/2004 | Hartman et al. |
| 2004/0221889 A1 | 11/2004 | Dreyer et al. |
| 2004/0226287 A1 | 11/2004 | Edgar et al. |
| 2005/0209714 A1 | 2/2005 | Rawlings et al. |
| 2005/0107895 A1 | 5/2005 | Pistikopoulos et al. |
| 2005/0143952 A1 | 6/2005 | Tomoyasu et al. |
| 2005/0171667 A1 | 8/2005 | Morita |
| 2005/0187643 A1 | 8/2005 | Sayyar-Rodsari et al. |
| 2005/0193739 A1 | 9/2005 | Brunell et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0168945 A1 | 8/2006 | Samad et al. |
| 2006/0265203 A1 | 11/2006 | Jenny et al. |
| 2006/0282178 A1 | 12/2006 | Das et al. |
| 2007/0101977 A1 | 5/2007 | Stewart |
| 2007/0142936 A1 | 6/2007 | Denison et al. |
| 2007/0144149 A1 | 6/2007 | Kolavennu et al. |
| 2007/0156259 A1 * | 7/2007 | Baramov | G05B 13/048 700/44 |
| 2007/0275471 A1 | 11/2007 | Coward |
| 2008/0010973 A1 | 1/2008 | Gimbres |
| 2008/0071395 A1 * | 3/2008 | Pachner | G05B 13/048 700/34 |
| 2008/0097625 A1 | 4/2008 | Vouzis et al. |
| 2008/0103747 A1 | 5/2008 | Macharia et al. |
| 2008/0103748 A1 | 5/2008 | Axelrud et al. |
| 2008/0104003 A1 | 5/2008 | Macharia et al. |
| 2008/0109100 A1 | 5/2008 | Macharia et al. |
| 2008/0125875 A1 | 5/2008 | Stewart et al. |
| 2008/0132178 A1 | 6/2008 | Chatterjee et al. |
| 2008/0183311 A1 | 7/2008 | MacArthur et al. |
| 2008/0208778 A1 | 8/2008 | Sayyar-Rodsari et al. |
| 2008/0244449 A1 | 10/2008 | Morrison et al. |
| 2008/0264036 A1 | 10/2008 | Bellovary |
| 2009/0005889 A1 | 1/2009 | Sayyar-Rodsari |
| 2009/0008351 A1 | 1/2009 | Schneider et al. |
| 2009/0043546 A1 | 2/2009 | Srinivasan et al. |
| 2009/0087029 A1 | 4/2009 | Coleman et al. |
| 2009/0131216 A1 | 5/2009 | Matsubara et al. |
| 2009/0182518 A1 | 7/2009 | Chu et al. |
| 2009/0198350 A1 | 8/2009 | Thiele |
| 2009/0204233 A1 | 8/2009 | Zhan et al. |
| 2009/0240480 A1 | 9/2009 | Baramov |
| 2009/0254202 A1 | 10/2009 | Pekar et al. |
| 2009/0287320 A1 | 11/2009 | MacGregor et al. |
| 2009/0312998 A1 | 12/2009 | Berckmans et al. |
| 2010/0017094 A1 | 1/2010 | Stewart et al. |
| 2010/0038158 A1 | 2/2010 | Whitney et al. |
| 2010/0050607 A1 | 3/2010 | He et al. |
| 2010/0122523 A1 | 5/2010 | Vosz |
| 2010/0126481 A1 | 5/2010 | Willi et al. |
| 2010/0204808 A1 | 8/2010 | Thiele |
| 2010/0268353 A1 | 10/2010 | Crisalle et al. |
| 2010/0300069 A1 | 12/2010 | Herrmann et al. |
| 2010/0300070 A1 | 12/2010 | He et al. |
| 2010/0305719 A1 | 12/2010 | Pekar et al. |
| 2010/0327090 A1 | 12/2010 | Havlena et al. |
| 2011/0006025 A1 | 1/2011 | Schneider et al. |
| 2011/0010073 A1 | 1/2011 | Stewart et al. |
| 2011/0029235 A1 | 2/2011 | Berry |
| 2011/0046752 A1 | 2/2011 | Piche |

(56) References Cited

U.S. PATENT DOCUMENTS

| | | | |
|---|---|---|---|
| 2011/0056265 A1 | 3/2011 | Yacoub | |
| 2011/0060424 A1 | 3/2011 | Havlena | |
| 2011/0066308 A1 | 3/2011 | Yang et al. | |
| 2011/0071653 A1 | 3/2011 | Kihas | |
| 2011/0087420 A1 | 4/2011 | Stewart et al. | |
| 2011/0104015 A1 | 5/2011 | Boyden et al. | |
| 2011/0125293 A1 | 5/2011 | Havlena | |
| 2011/0125295 A1 | 5/2011 | Bednasch et al. | |
| 2011/0131017 A1 | 6/2011 | Cheng et al. | |
| 2011/0167025 A1 | 7/2011 | Danai et al. | |
| 2011/0257789 A1 | 10/2011 | Stewart et al. | |
| 2011/0264353 A1* | 10/2011 | Atkinson | F02D 41/1402 701/102 |
| 2011/0270505 A1 | 11/2011 | Chaturvedi et al. | |
| 2011/0301723 A1 | 12/2011 | Pekar et al. | |
| 2012/0024089 A1 | 2/2012 | Couey et al. | |
| 2012/0109620 A1 | 5/2012 | Gaikwad et al. | |
| 2013/0030554 A1 | 1/2013 | Macarthur et al. | |
| 2013/0067894 A1 | 3/2013 | Stewart et al. | |
| 2013/0111878 A1 | 5/2013 | Pachner et al. | |
| 2013/0111905 A1 | 5/2013 | Pekar et al. | |
| 2013/0131956 A1 | 5/2013 | Thibault et al. | |
| 2013/0131967 A1 | 5/2013 | Yu et al. | |
| 2013/0204403 A1 | 8/2013 | Zheng et al. | |
| 2013/0338900 A1 | 12/2013 | Ardanese et al. | |
| 2014/0032189 A1 | 1/2014 | Hehle et al. | |
| 2014/0034460 A1 | 2/2014 | Chou | |
| 2014/0316683 A1* | 10/2014 | Whitney | F02D 11/105 701/108 |
| 2014/0318216 A1 | 10/2014 | Singh | |
| 2014/0343713 A1 | 11/2014 | Ziegler et al. | |
| 2014/0358254 A1 | 12/2014 | Chu et al. | |
| 2015/0121071 A1 | 4/2015 | Schwarz et al. | |
| 2015/0275783 A1* | 10/2015 | Wong | F02D 28/00 701/102 |
| 2015/0354877 A1 | 12/2015 | Burns et al. | |
| 2016/0108732 A1* | 4/2016 | Huang | F02D 41/1406 700/282 |
| 2016/0147203 A1* | 5/2016 | Di Cairano | G05B 13/042 700/30 |
| 2016/0362838 A1* | 12/2016 | Badwe | G05B 13/048 |

FOREIGN PATENT DOCUMENTS

| | | |
|---|---|---|
| DE | 19628796 | 10/1997 |
| DE | 10219832 | 11/2002 |
| DE | 102009016509 | 10/2010 |
| DE | 102011103346 A1 | 8/2012 |
| EP | 0301527 | 2/1989 |
| EP | 0950803 | 4/1999 |
| EP | 0877309 | 6/2000 |
| EP | 1134368 | 3/2001 |
| EP | 1180583 | 2/2002 |
| EP | 1221544 | 7/2002 |
| EP | 1225490 | 7/2002 |
| EP | 1245811 | 10/2002 |
| EP | 1273337 | 1/2003 |
| EP | 1420153 A2 | 5/2004 |
| EP | 1447727 A2 | 8/2004 |
| EP | 1425642 | 11/2005 |
| EP | 1686251 | 8/2006 |
| EP | 1399784 | 10/2007 |
| EP | 2107439 | 10/2009 |
| EP | 2146258 | 1/2010 |
| EP | 1794339 | 7/2011 |
| EP | 1529941 | 11/2011 |
| EP | 2543845 A1 | 1/2013 |
| EP | 2551480 A1 | 1/2013 |
| EP | 2589779 A2 | 5/2013 |
| EP | 2617975 | 7/2013 |
| EP | 2267559 | 1/2014 |
| EP | 2919079 | 9/2015 |
| JP | 59190443 | 10/1984 |
| JP | 2010282618 | 12/2010 |
| WO | 0144629 A2 | 6/2001 |
| WO | WO 02/32552 | 4/2002 |
| WO | WO 02/097540 | 12/2002 |
| WO | WO 02/101208 | 12/2002 |
| WO | WO 03/023538 | 3/2003 |
| WO | 03048533 A1 | 6/2003 |
| WO | WO 2003/048533 | 6/2003 |
| WO | WO 03/065135 | 8/2003 |
| WO | WO 03/078816 | 9/2003 |
| WO | WO 2004/027230 | 4/2004 |
| WO | WO 2006/021437 | 3/2006 |
| WO | WO 2007/078907 | 7/2007 |
| WO | WO 2008/033800 | 3/2008 |
| WO | WO 2008/115911 | 9/2008 |
| WO | WO 2012/076838 | 6/2012 |
| WO | WO 2013/119665 | 8/2013 |
| WO | WO 2014/165439 | 10/2014 |
| WO | WO 2016/053194 | 4/2016 |

OTHER PUBLICATIONS https://www.en.wikipedia.org/wiki/Public-key_cryptography, "Public-Key Cryptography," 14 pages, printed Feb. 26, 2016.

Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.

Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.

Jensen, "The 13 Monitors of an OBD System," http://www.oemoffhighway.com/article/1 0855512/the-13-monito . . . , 3 pages, printed Oct. 3, 2016.

Kihas et al., "Chapter 14, Diesel Engine SCR Systems: Modeling Measurements and Control," Catalytic Reduction Technology (book), Part 1, Chapter 14, prior to Jan. 29, 2016.

Krause et al., "Effect of Inlet Air Humidity and Temperature on Diesel Exhaust Emissions," SAE International Automotive Engineering Congress, 8 pages, Jan. 8-12, 1973.

Lavoie et al., "Experimental and Theoretical Study of Nitric Oxide Formation in Internal Combustion Engines," Combustion Science and Technology, vol. 1, pp. 313-326, 1970.

Manchur et al., "Time Resolution Effects on Accuracy of Real-Time NOx Emissions Measurements," SAE Technical Paper Series 2005-01-0674, 2005 SAE World Congress, 19 pages, Apr. 11-14, 2005.

Mohammadpour et al., "A Survey on Diagnostics Methods for Automotive Engines," 2011 American Control conference, pp. 985-990, Jun. 29-Jul. 1, 2011.

Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.

Olsen, "Analysis and Simulation of the Rate of Heat Release (ROHR) in Diesel Engines," MSc-Assignment, 105 pages, Jun. 2013.

Payri et al., "Diesel NOx Modeling with a Reduction Mechanism for the Initial NOx Coming from EGR or Re-Entrained Burned Gases," 2008 World Congress, SAE Technical Paper Series 2008-01-1188, 13 pages, Apr. 14-17, 2008.

Payri et al., "Methodology for Design and Calibration of a Drift Compensation Method for Fuel-to-Air Ratio," SAE International 2012-01-0717, 13 pages, Apr. 16, 2012.

Pipho et al., "NO2 Formation in a Diesel Engine," SAE Technical Paper Series 910231, International Congress and Exposition, 15 pages, Feb. 25-Mar. 1, 1991.

Querel et al., "Control of an SCR System Using a Virtual NOx Sensor," 7th IFAC Symposium on Advances in Automotive Control, The International Federation of Automotive Control, pp. 9-14, Sep. 4-7, 2013.

Ricardo Software, "Powertrain Design at Your Fingertips," retrieved from http://www.ricardo.com/PageFiles/864/WaveFlyerA4_4PP.pdf, 2 pages, downloaded Jul. 27, 2015.

(56) References Cited

OTHER PUBLICATIONS

Santin et al., "Combined Gradient/Newton Projection Semi-Explicit QP Solver for Problems with Bound Constraints," 2 pages, prior to Jan. 29, 2016.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.
Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, Front and Back Covers and Table of Contents are Provided, 2009.
Van Helden et al., "Optimization of Urea SCR deNOx Systems for HD Diesel Engines," SAE International 2004-01-0154, 13 pages, 2004.
VDO, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Sensing Exhaust NO2 Emissions Using the Mixed Potential Principal," SAE 2014-01-1487, 7 pages, Apr. 1, 2014.
Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-01-1509, 11 pages, 2009.
Winkler et al., "Incorporating Physical Knowledge About the Formation of Nitric Oxides into Evolutionary System Identification," Proceedings of the 20th European Modeling and Simulation Symposium (EMSS), 6 pages, 2008.

Winkler et al., "On-Line Modeling Based on Genetic Programming," 12 pages, International Journal on Intelligent Systems Technologies and Applications 2, 2007.
Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Winkler, "Evolutionary System Identification—Modern Approaches and Practical Applications," Kepler Universitat Linz, Reihe C: Technik und Naturwissenschaften, Universitatsverlag Rudolf Trauner, 2009.
Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Yao et al., "The Use of Tunnel Concentration Profile Data to Determine the Ratio of NO2/NOx Directly Emitted from Vehicles," HAL Archives, 19 pages, 2005.
Zaman, "Lincoln Motor Company: Case study 2015 Lincoln MKC," Automotive Electronic Design Fundamentals, Chapter 6, 2015.
Zeldovich, "The Oxidation of Nitrogen in Combustion and Explosions," ACTA Physiochimica U.R.S.S., vol. XX1, No. 4, 53 pages, 1946.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
U.S. Appl. No. 15/011,445, filed Jan. 29, 2016.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
"Model Predictive Control Toolbox Release Notes," The Mathworks, 24 pages, Oct. 2008.
"Model Predictive Control," Wikipedia, pp. 1-5, Jan. 22, 2009. http://en.wikipedia.org/w/index.php?title=Special:Book&bookcmd=download&collecton_id=641cd1b5da77cc22&writer=rl&return_to=Model predictive control, retrieved Nov. 20, 2012.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_ . . . , 5 pages, printed Sep. 27, 2016.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Andersson et al., "Fast Physical NOx Prediction in Diesel Engines, The Diesel Engine: The Low CO2 and Emissions Reduction Challenge," Conference Proceedings, Lyon, 2006.
Arregle et al., "On Board NOx Prediction in Diesel Engines: A Physical Approach," Automotive Model Predictive Control, Models Methods and Applications, Chapter 2, 14 pages, 2010.
Asprion, "Optimal Control of Diesel Engines," PHD Thesis, Diss ETH No. 21593, 436 pages, 2013.

(56) References Cited

OTHER PUBLICATIONS

Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.

Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.

Axehill et al., "A Dual Gradient Projection Quadratic Programming Algorithm Tailored for Mixed Integer Predictive control," Technical Report from Linkopings Universitet, Report No. Li—Th-ISY-R-2833, 58 pages, Jan. 31, 2008.

Baffi et al., "Non-Linear Model Based Predictive Control Through Dynamic Non-Linear Partial Least Squares," Trans IChemE, vol. 80, Part A, pp. 75-86, Jan. 2002.

Bako et al., "A Recursive Identification Algorithm for Switched Linear/Affine Models," Nonlinear Analysis: Hybrid Systems, vol. 5, pp. 242-253, 2011.

Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.

Blanco-Rodriguez, "Modelling and Observation of Exhaust Gas Concentrations for Diesel Engine Control," Phd Dissertation, 242 pages, Sep. 2013.

Blue Streak Electronics Inc., "Ford Modules," 1 page, May 12, 2010.

Bourn et al., "Advanced Compressor Engine Controls to Enhance Operation, Reliability and Integrity," Southwest Research Institute, DOE Award No. DE-FC26-03N141859, SwRI Project No. 03.10198, 60 pages, Mar. 2004.

Charalampidis et al., "Computationally Efficient Kalman Filtering for a Class of Nonlinear Systems," IEEE Transactions on Automatic Control, vol. 56, No. 3, pp. 483-491, Mar. 2011.

Chew, "Sensor Validation Scheme with Virtual NOx Sensing for Heavy Duty Diesel Engines," Master's Thesis, 144 pages, 2007.

The Extended European Search Report for EP Application No. 15155295.7-1606, dated Aug. 4, 2015.

The Extended European Search Report for EP Application No. 15179435.1, dated Apr. 1, 2016.

Desantes et al., "Development of NOx Fast Estimate Using NOx Sensor," EAEC 2011 Congress, 2011.

Ding, "Characterising Combustion in Diesel Engines, Using Parameterised Finite Stage Cylinder Process Models," 281 pages, Dec. 21, 2011.

Docquier et al., "Combustion Control and Sensors: a Review," Progress in Energy and Combustion Science, vol. 28, pp. 107-150, 2002.

Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.

Ericson, "NOx Modelling of a Complete Diesel Engine/SCR System," Licentiate Thesis, 57 pages, 2007.

Finesso et al., "Estimation of the Engine-Out NO2/NOx Ration in a Euro VI Diesel Engine," SAE International 2013-01-0317, 15 pages, Apr. 8, 2013.

Fleming, "Overview of Automotive Sensors," IEEE Sensors Journal, vol. 1, No. 4, pp. 296-308, Dec. 2001.

Ford Motor Company, "2012 My OBD System Operation Summary for 6.7L Diesel Engines," 149 pages, Apr. 21, 2011.

Formentin et al., "NOx Estimation in Diesel Engines Via In-Cylinder Pressure Measurement," IEEE Transactions on Control Systems Technology, vol. 22, No. 1, pp. 396-403, Jan. 2014.

Galindo, "An On-Engine Method for Dynamic Characterisation of NOx Concentration Sensors," Experimental Thermal and Fluid Science, vol. 35, pp. 470-476, 2011.

Gamma Technologies, "Exhaust Aftertreatment with GT-Suite," 2 pages, Jul. 17, 2014.

Goodwin, "Researchers Hack a Corvette's Brakes via Insurance Black Box," Downloaded from http://www.cnet.com/roadshow/news/researchers-hack-a-corvettes-brakes-via-insurance-black-box/, 2 pages, Aug. 2015.

Greenberg, "Hackers Remotely Kill a Jeep on the Highway—With Me in It," Downloaded from http://www.wired.com/2015/07/hackers-remotely-kill-jeep-highway/, 24 pages, Jul. 21, 2015.

Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.

Guardiola et al., "A Computationally Efficient Kalman Filter Based Estimator for Updating Look-Up Tables Applied to NOx Estimation in Diesel Engines," Control Engineering Practice, vol. 21, pp. 1455-1468.

Guzzella et al., "Introduction to Modeling and Control of Internal Combustion Engine Systems," 303 pages, 2004.

Hahlin, "Single Cylinder ICE Exhaust Optimization," Master's Thesis, retrieved from https://pure.ltu.se/portal/files/44015424/LTU-EX-2013-43970821.pdf, 50 pages, Feb. 1, 2014.

Hammacher Schlemmer, "The Windshield Heads Up Display," Catalog, p. 47, prior to Apr. 26, 2016.

Heywood, "Pollutant Formation and Control," Internal Combustion Engine Fundamentals, pp. 567-667, 1988.

Hirsch et al., "Dynamic Engine Emission Models," Automotive Model Predictive Control, Chapter 5, 18 pages, LNCIS 402, 2012.

Hirsch et al., "Grey-Box Control Oriented Emissions Models," The International Federation of Automatic Control (IFAC), Proceedings of the 17th World Congress, pp. 8514-8519, Jul. 6-11, 2008.

Hockerdal, "EKF-based Adaptation of Look-Up Tables with an Air Mass-Flow Sensor Application," Control Engineering Practice, vol. 19, 12 pages, 2011.

http://nexceris.com/news/nextech-materials/, "NEXTECH Materials is Now NEXCERIS," 7 pages, printed Oct. 4, 2016.

http://www.arb.ca.gov/msprog/obdprog/hdobdreg.htm, "Heavy-Duty OBD Regulations and Rulemaking," 8 pages, printed Oct. 4, 2016.

"MPC Implementation Methods for the Optimization of the Response of Control Valves to Reduce Variability," Advanced Application Note 002, Rev. A, 10 pages, 2007.

"SCR, 400-csi Coated Catalyst," Leading NOx Control Technologies Status Summary, 1 page prior to Feb. 2, 2005.

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad et al., "Model Predictive Control Toolbox 3, User's Guide," Matlab Mathworks, 282 pages, 2008.

Bemporad et al., "The Explicit Linear Quadratic Regulator for Constrained Systems," Automatica, 38, pp. 3-20, 2002.

Bemporad, "Model Predictive Control Based on Linear Programming—The Explicit Solution," IEEE Transactions on Automatic Control, vol. 47, No. 12, pp. 1974-1984, Dec. 2002.

Bemporad, "Model Predictive Control Design: New Trends and Tools," Proceedings of the $45^{th}$ IEEE Conference on Decision & Control, pp. 6678-6683, Dec. 13-15, 2006.

Bemporad, et al., "Explicit Model Predictive Control," 1 page, prior to Feb. 2, 2005.

Bertsekas, "On the Goldstein-Levitin-Polyak Gradient Projection Method," IEEE Transactions on Automatic Control, vol. AC-21, No. 2, pp. 174-184, Apr. 1976.

Bertsekas, "Projected Newton Methods for Optimization Problems with Simple Constraints," SIAM J. Control and Optimization, vol. 20, No. 2, pp. 221-246, Mar. 1982.

Borrelli et al., "An MPC/Hybrid System Approach to Traction Control," IEEE Transactions on Control Systems Technology, vol. 14, No. 3, pp. 541-553, May 2006.

(56) References Cited

OTHER PUBLICATIONS

Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Catalytica Energy Systems, "Innovative NOx Reduction Solutions for Diesel Engines," 13 pages, 3rd Quarter, 2003.
Chatterjee, et al. "Catalytic Emission Control for Heavy Duty Diesel Engines," JM, 46 pages, prior to Feb. 2, 2005.
Search Report for Corresponding EP Application No. 11167549.2 dated Nov. 27, 2012.
De Oliveira, "Constraint Handling and Stability Properties of Model Predictive Control," Carnegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, Va, pp. 319-324, Jun. 2001.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Dunbar, "Model Predictive Control: Extension to Coordinated Multi-Vehicle Formations and Real-Time Implementation," CDS Technical Report 01-016, 64 pages, Dec. 7, 2001.
GM "Advanced Diesel Technology and Emissions," powertrain technologies—engines, 2 pages, prior to Feb. 2, 2005.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer a Distributed Quadratic Program (DQP) Concepts Reference," 48 pages, prior to Feb. 2, 2005.
http://vvww.not2fast.wryday.com/turbo/glossary/turbo_glossary.shtml, "Not2Fast: Turbo Glossary," 22 pages, printed Oct. 1, 2004.
http://www.tai-cwv.com/sb1106.0.html, "Technical Overview—Advanced Control Solutions," 6 pages, printed Sep. 9, 2004.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Keulen et al., "Predictive Cruise Control in Hybrid Electric Vehicles", May 2009, World Electric Journal, vol. 3, ISSN 2032-6653.
Kolmanovsky, et al., "Issues in Modeling and Control of Intake Flow in Variable Geometry Turbocharged Engines", 18th IFIP Conf. System Modeling and Optimization, pp. 436-445, Jul. 1997.
Kulhavy, et al. "Emerging Technologies for Enterprise Optimization in the Process Industries," Honeywell, 12 pages, Dec. 2000.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Maciejowski, "Predictive Control with Constraints," Prentice Hall, Pearson Education Limited, 4 pages, 2002.
Mariethoz et al., "Sensorless Explicit Model Predictive Control of the DC-DC Buck Converter with Inductor Current Limitation," IEEE Applied Power Electronics Conference and Exposition, pp. 1710-1715, 2008.
Marjanovic, "Towards a Simplified Infinite Horizon Model Predictive Controller," 6 pages, Proceedings of the $5^{th}$ Asian Control Conference, 6 pages, Jul. 20-23, 2004.
Mayne et al., "Constrained Model Predictive Control: Stability and Optimality," Automatica, vol. 36, pp. 789-814, 2000.
Mehta, "The Application of Model Predictive Control to Active Automotive Suspensions," 56 pages, May 17, 1996.
Moore, "Living with Cooled-EGR Engines," Prevention Illustrated, 3 pages, Oct. 3, 2004.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control—Sulfur Effects Project (DECSE) Summary of Reports," U.S. Department of Energy, 19 pages, Feb. 2002.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control," IEEE Transactions on Automatic Control, vol. 52, No. 6, 6 pages, 2007.
Patrinos et al., "A Global Piecewise Smooth Newton Method for Fast Large-Scale Model Predictive Control," Tech Report TR2010-02, National Technical University of Athens, 23 pages, 2010.
Qin et al., "A Survey of Industrial Model Predictive Control Technology," Control Engineering Practice, 11, pp. 733-764, 2003.
Rajamani, "Data-based Techniques to Improve State Estimation in Model Predictive Control," Ph.D. Dissertation, 257 pages, 2007.
Rawlings, "Tutorial Overview of Model Predictive Control," IEEE Control Systems Magazine, pp. 38-52, Jun. 2000.
Salvat, et al., "Passenger Car Serial Application of a Particulate Filter System on a Common Rail Direct Injection Engine," SAE Paper No. 2000-01-0473, 14 pages, Feb. 2000.
Schauffele et al., "Automotive Software Engineering Principles, Processes, Methods, and Tools," SAE International, 10 pages, 2005.
Shamma, et al. "Approximate Set-Valued Observers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the $47^{th}$ IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Storset, et al., "Air Charge Estimation for Turbocharged Diesel Engines," vol. 1 Proceedings of the American Control Conference, 8 pages, Jun. 28-30, 2000.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

(56) References Cited

OTHER PUBLICATIONS

Tondel et al., "An Algorithm for Multi-Parametric Quadratic Programming and Explicit MPC Solutions," Automatica, 39, pp. 489-497, 2003.
Van Basshuysen et al., "Lexikon Motorentechnik," (Dictionary of Automotive Technology) published by Vieweg Verlag, Wiesbaden 039936, p. 518, 2004. (English Translation).
Van Den Boom et al., "MPC for Max-Plus-Linear Systems: Closed-Loop Behavior and Tuning," Proceedings of the 2001 American Control Conference, Arlington, Va, pp. 325-330, Jun. 2001.
Van Keulen et al., "Predictive Cruise Control in Hybrid Electric Vehicles," World Electric Vehicle Journal vol. 3, ISSN 2032-6653, pp. 1-11, 2009.
Wang et al., "Fast Model Predictive Control Using Online Optimization," Proceedings of the 17$^{th}$ World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Wright, "Applying New Optimization Algorithms to Model Predictive Control," 5th International Conference on Chemical Process Control, 10 pages, 1997.
Zavala et al., "The Advance-Step NMPC Controller: Optimality, Stability, and Robustness," Automatica, vol. 45, pp. 86-93, 2009.
Zeilinger et al., "Real-Time MPC—Stability Through Robust MPC Design," Joint 48$^{th}$ IEEE Conference on Decision and Control and 28$^{th}$ Chinese Control Conference, Shanghai, P.R. China, pp. 3980-3986, Dec. 16-18, 2009.
Zelenka, et al.,"An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.

* cited by examiner

Off-line part:

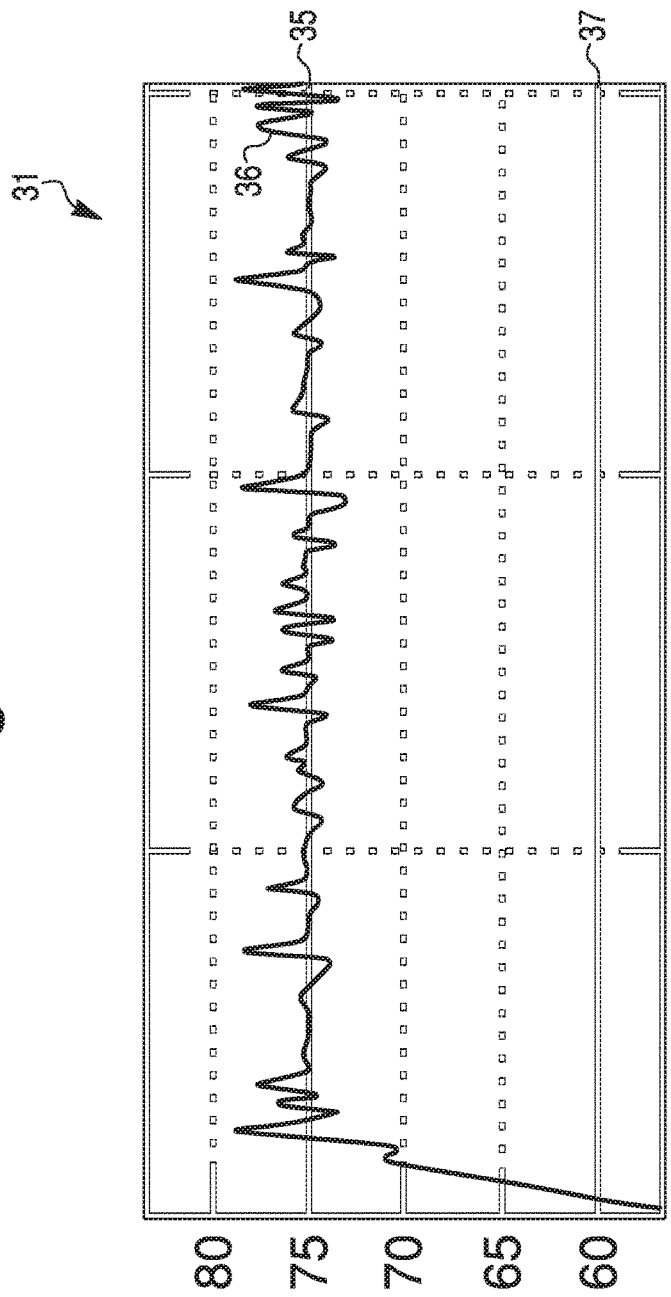

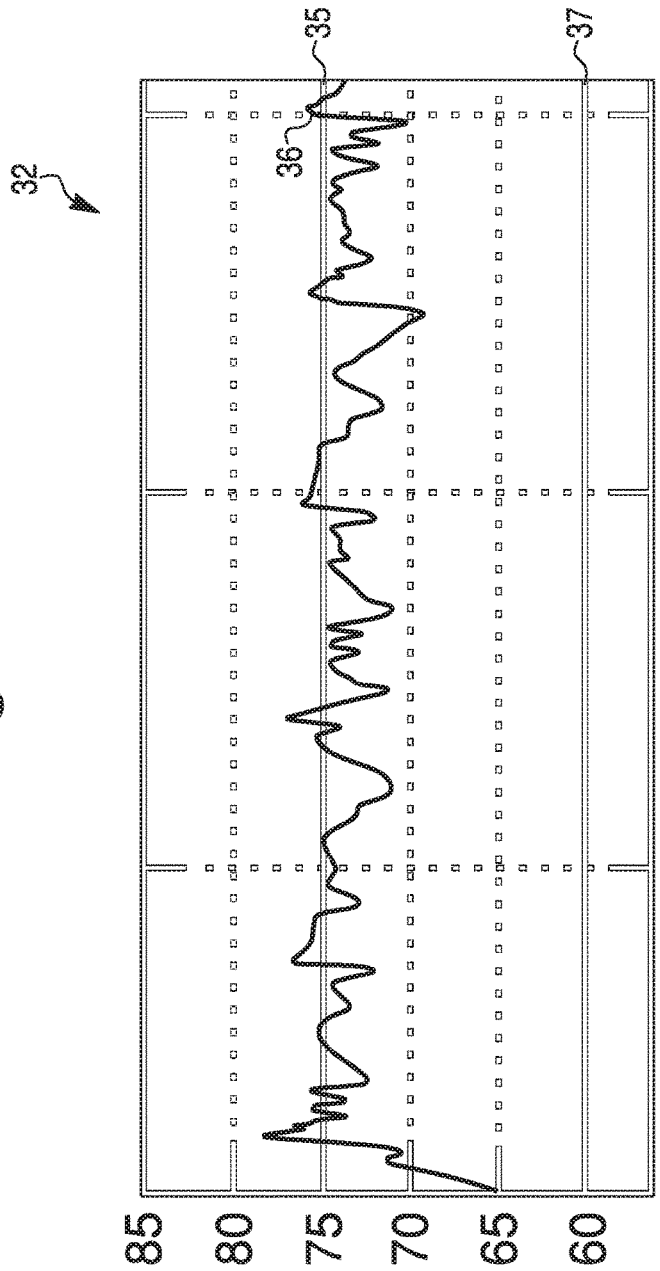

APPROACH AND SYSTEM FOR HANDLING CONSTRAINTS FOR MEASURED DISTURBANCES WITH UNCERTAIN PREVIEW

BACKGROUND

The present disclosure pertains to control of systems relating to vehicle systems and particularly to those involving model predictive control.

SUMMARY

The disclosure reveals an approach and system for robust constraints handling for measured disturbances with uncertain preview on a prediction horizon in model predictive control with application in automotive control systems. A robust constraints handling system may incorporate a mechanism for measuring disturbances of automotive control subsystems, a model predictive controller that provides model predictive control, connected to the mechanism for measuring disturbances, and a sensor subsystem that collects information about an uncertainty of measured disturbances. The measured disturbances may have an uncertain preview over a prediction horizon. Estimates for the disturbances over the prediction horizon may be made of the preview.

BRIEF DESCRIPTION OF THE DRAWING

FIGS. 8a, 8b and 8c are diagrams of waveforms of a cases of maximum limit handling of a controlled variable without robust constraints handling, balanced tuning for robust constraints handling, and conservative tuning for robust constraints handling, respectively.

DESCRIPTION

Figure 1A:
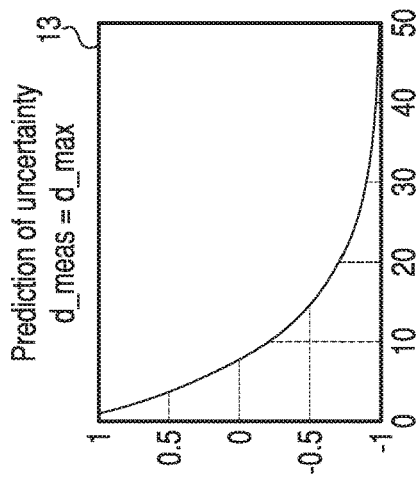
FIGS. 1a, 1b and 1c are diagrams of graphs for predictions of uncertainty of measured disturbances over the prediction horizon.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Control issues in the automotive industry may result in complex systems. The complexity may be driven by a number of subsystems that need to be precisely controlled. An example may be an internal combustion engine. The individual subsystems of the engine may incorporate, for example, air path, fuel injection system, thermal management system, aftertreatment system, and so on.

The individual subsystems may be controlled by sophisticated control architectures. The main challenge for a controller may be to deliver prescribed performance (e.g., setpoint tracking or fuel economy optimization) while maintaining the controlled variables within the prescribed limits. The limits are usually given by performance or safety requirements. For example, in thermal management, it is important not to violate the upper limit of coolant temperature due to safety reasons.

Another example may be an upper limit of exhaust gas temperature at the outlet of a diesel oxidation catalyst (DOC) or diesel particulate filter (DPF) during the DPF regeneration process (i.e., cleaning process), low limit of engine out oxygen concentration (or lambda), upper limit of turbocharger speed, upper limit of boost or charge pressure, and so on.

Virtually all the limits need to be maintained by the controller. One of the challenges may include a preview of uncertainty of the disturbance variables over the prediction horizon when the model predictive control (MPC) is used. For example, it appears difficult to predict driver's behavior, in terms of engine speed and torque request, vehicle velocity, ambient conditions, and so forth. Such variables cannot necessarily be predicted accurately on the prediction horizon and therefore the controller should be robust against the disturbance variables' uncertainties. The price for robustness is usually degradation of performance, resulting in a decrease of fuel economy of the vehicle.

A model predictive controller, as referred to herein, may be a device or mechanism that provides model predictive control.

The present system may target an improvement of robust constraints handling of a model predictive control approach while utilizing information about the uncertainty of measured disturbance variables (e.g., vehicle speed, driver's torque request, and so forth). In automotive applications, an approach of constraints handling may be based on various non-systematic approaches, which leads to great conservativeness to ensure robustness under virtually all considered situations e.g., a driver's aggressive tip-in, or sudden vehicle acceleration). A conservative tuning of the control strategy leads to degradation of performance or fuel economy.

A model predictive control (MPC) algorithm may be used to control the multivariable systems in automotive application under nominal conditions (e.g., no uncertainties). There may be many advantages to apply MPC to control vehicle subsystems. The best performance of MPC my be achieved if it is possible to predict future trajectories of virtually all important disturbance variables for a particular subsystem, which is not necessarily possible in many practical applications (e.g., driver's torque command and vehicle speed). On the other hand, it appears possible to estimate the expected uncertainty range of such variables over the MPC prediction horizon.

The present system may provide an approach of systematic handling of constraints in presence of measured disturbance variables with uncertainties over the prediction horizon. The approach may be based on MPC algorithm and can improve robust handling of constraints in a very systematic way, if the uncertainty of selected variables can be predicted or approximated on the prediction horizon. The approach may reduce the original prescribed limits on the prediction horizon so that even for the worst case disturbance values combination, the probability of violating the original prescribed limits is decreased when compared to a standard controller without the robust constraints handling approach. The approach uses information (e.g., model) about the dynamic behavior of the controlled system.

The present approach may be implemented as a modified MPC algorithm in a form of a computer program which can b hosted on an embedded control system, for example, a control unit of a vehicle. The approach may be applied namely to control the vehicle subsystems where the robust constraints handling in presence of measured disturbances with uncertain prediction is critical for a safe operation. As an example, one may mention subsystems like thermal management, DOC and DPF control during the DPF regeneration process, turbocharger speed, lambda sensors of the engine air path, boost or charge pressure of a turbocharged engine, and so on. The measured disturbance variables with uncertain preview over the prediction horizon may be vehicle speed, driver's torque request (pedal position), exhaust gas flow, ambient conditions, and so forth.

Figure 3:
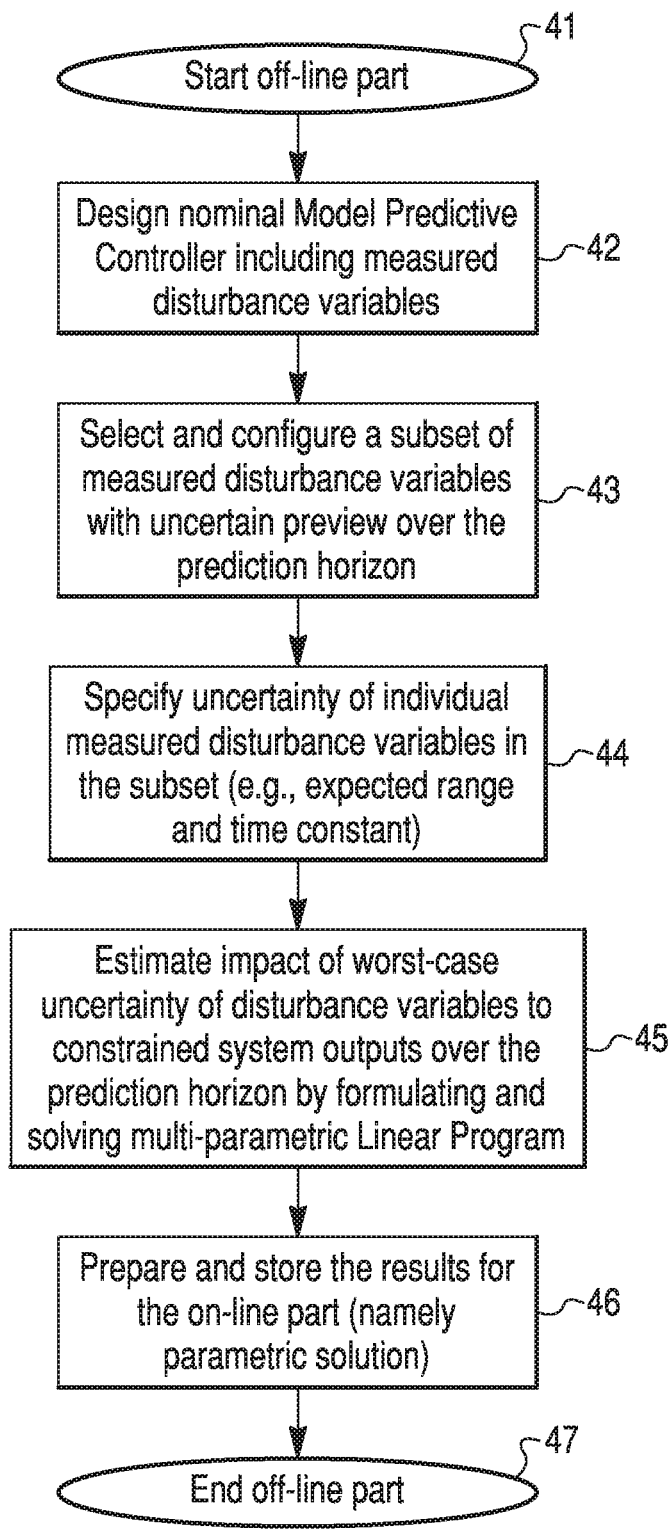
FIG. 3 is a diagram of a flowchart of an off-line part of an algorithm for the present approach.
Figure 5:
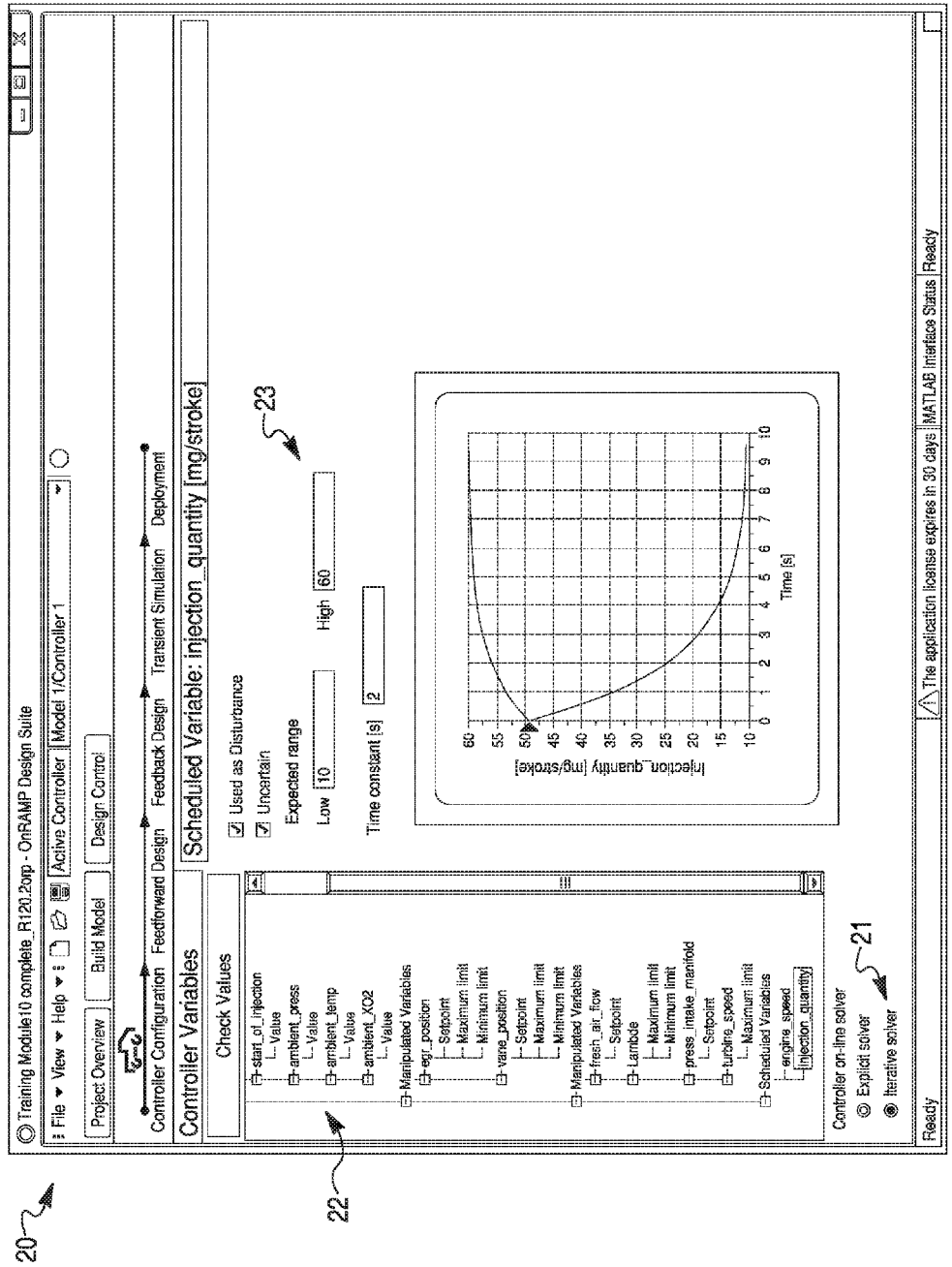
FIG. 5 is a diagram of a screen where uncertainty may be configured for exogenous or scheduled variables, or any external input of the controlled system that is not manipulated by the controller.

FIG. 3 is a diagram of a flowchart of an off-line part of an algorithm for the present approach. Symbol 41 indicates a start off-line part. Design nominal Model Predictive Controller including measured disturbance variables is indicated in symbol 42. Symbol 43 indicates a select and configure a subset of measured disturbance variables with uncertain preview over the prediction horizon. One may specify an uncertainty of individual measured disturbance variables in the subset (e.g., expected range and time constant) as indicated in symbol 44. Examples of the activity in symbols 43 and 44 may be given in screen 20 of FIG. 5. In symbol 45, one may estimate an impact of worst-case uncertainty of disturbance variables to constrained system outputs over the prediction horizon by formulating and solving a multi-parametric Linear Program. Screens 24 and 25 of FIGS. 6 and 7, respectively, may provide examples of the activity in symbol 45. One may prepare and store the results for the on-line part (namely parametric solution) in symbol 46. An example of symbol 46 activity may be in FIG. 7. The off-line part may be ended at symbol 47.

Figure 4:
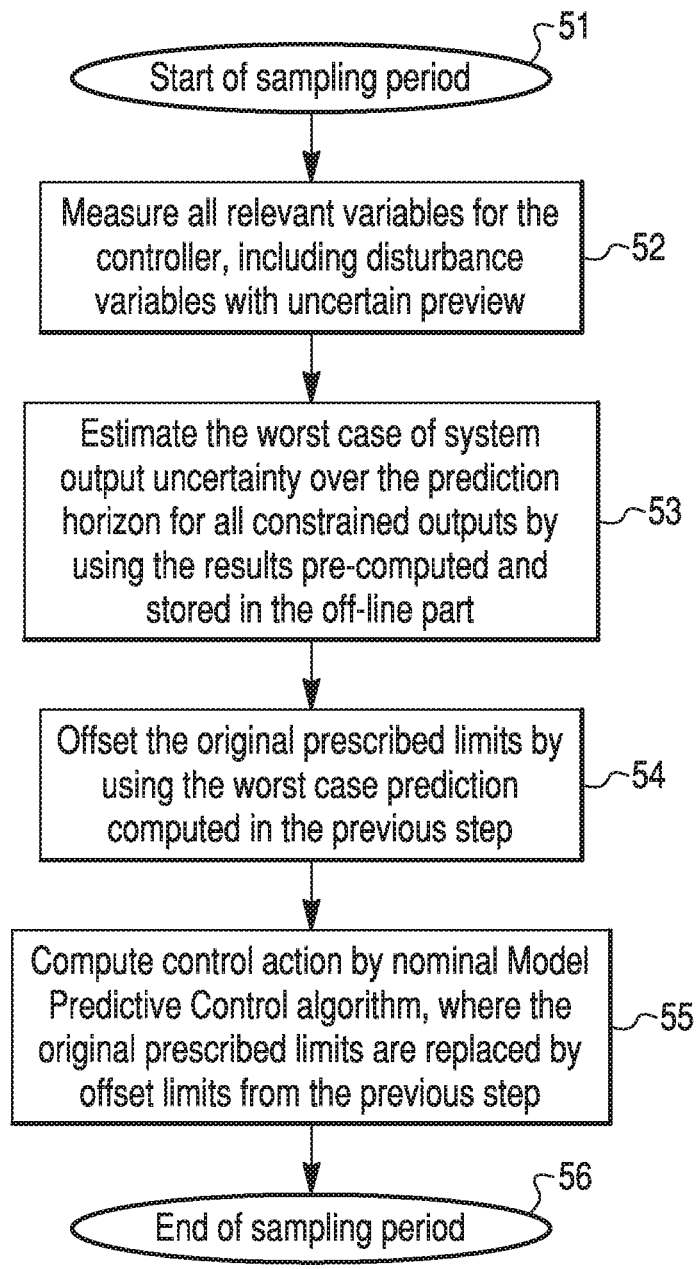
FIG. 4 is a diagram of flowchart of an on-line part of an algorithm for the present approach.

FIG. 4 is a diagram of a flowchart of an on-line part of an algorithm for the present approach. The on-line part may begin with a start of a sampling period at symbol 51. One may measure virtually all relevant variables for the controller, including disturbance variables with uncertain preview, at symbol 52. Symbol 53 may indicate estimate the worst case of system output uncertainty over the prediction horizon for virtually all constrained outputs by using the results pre-computed and stored in the off-line part. Offset the original prescribed limits by using the worst case prediction computed in the previous step may be indicated in symbol 54. Compute control action by nominal Model Predictive Control algorithm, where the original prescribed limits are replaced by offset limits from the previous step, may be indicated in symbol 55. The off-line part may be ended with an end of the sampling period as indicated by symbol 56.

An uncertainty specification relative to robust constraints handling may be noted. A disturbance variable d may be assumed, and then output prediction in a single operating point is given by equation $$y_n - y_0 = H_d(d_{meas} - d_0)$$

where yn is the system output prediction, y0 is a point of system output linearization, Hd is a matrix carrying information about the linearized model and nominal controller of the controlled system, dmeas is a measured value of the disturbance variable d and d0 is a point of disturbance variable linearization. Output prediction yn may be based on open loop or closed loop. An absolute limit of measured disturbance variable dmeas may be $$d_{min} \leq d_{meas} \leq d_{max}.$$

Uncertainty of disturbance variable may be estimated as a measured value dmeas minus assumed value dassumed as indicated by $$\Delta d = d_{meas} - d_{assumed}.$$

If an assumed (uncertain) disturbance estimation is available over the prediction horizon, then $$\Delta d = 0$$

If an assumed (uncertain) disturbance estimation is not available, then it must be estimated. A preview on the prediction horizon may be available. Or a preview on the prediction horizon is not necessarily available and a prediction may be by estimated by a constant value. An effect of uncertainty to system output may be estimated as indicated by $$\Delta y = H_d \Delta d$$

Figure 1B:
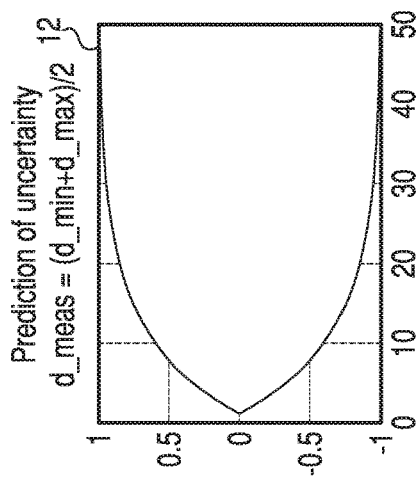
Figure 1C:
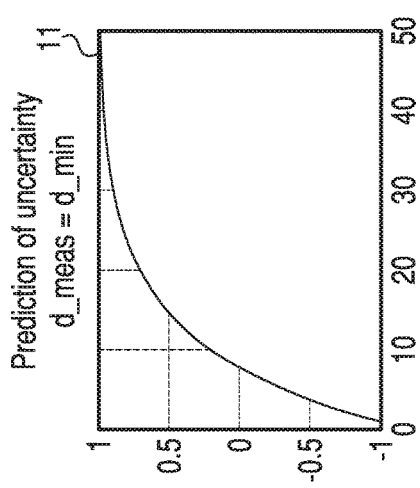

One may assume that the following parameters are known. The parameters may include uncertainty mM value, uncertainty max value, and current d_meas value. Estimation of Uncertainty bounds over the prediction horizon may be approximated by a filter (e.g., first order). Figure 1a is a diagram of a graph 11 for a prediction of uncertainty of d_meas=d_min. FIG. 1b is a diagram of a graph 12 for a prediction of uncertainty of d_meas=(d_min+d_max)/2. FIG. 1c is a diagram of a graph 13 for a prediction of uncertainty of d_meas=d_max. A relationship may be expressed $$H_f(d_{min} - d) \leq \Delta d \leq H_f(d_{max} - d) d_{min} \leq d \leq d_{max},$$

where Hf is a matric carrying information about the model (e.g., first order filter) that is used to estimate how the uncertainty of the disturbance variable is being developed over the prediction horizon.

A worst case of system output uncertainty over the prediction horizon may be computed by formulating an optimization problem as $$\Delta y_{min}^i = \min_{\Delta d} h_d^i \Delta d$$

$$\Delta y_{max}^i = \max_{\Delta d} h_d^i \Delta d,$$

which may be subject to $$H_f(d_{min} - d_{meas}) \leq \Delta d \leq H_f(d_{max} - d_{meas}) d_{min} \leq d_{meas} \leq d_{max} d_{min} \leq d_{max},$$

where drain, dmeas and dmax may be seen as parameters in parametric linear programming, indedx i indicates i-th sample in the prediction horizon, h_d^i is the i-th row of matrix Hd A linear program (LP) may be solved as a multi-parameter linear program (MPLP). If there is just one region (combination of active constraints), then the worst case of system output uncertainty over the prediction horizon may be estimated explicitly, as indicated by $$\Delta y_{min} = B_{min} \begin{bmatrix} d_{min} \\ d_{max} \\ d_{meas} \end{bmatrix} \qquad \Delta y_{max} = B_{max} \begin{bmatrix} d_{min} \\ d_{max} \\ d_{meas} \end{bmatrix}$$

The matrices $B_{min}$ and $B_{max}$ may be re-computed online if needed. The vector with dmin, dmax and dmeas is the parameter vector of the parametric solution. The original limits may be then offset by $\Delta y_{min}$ and $\Delta y_{max}$ in each sampling period of the controller.

Figure 2A:
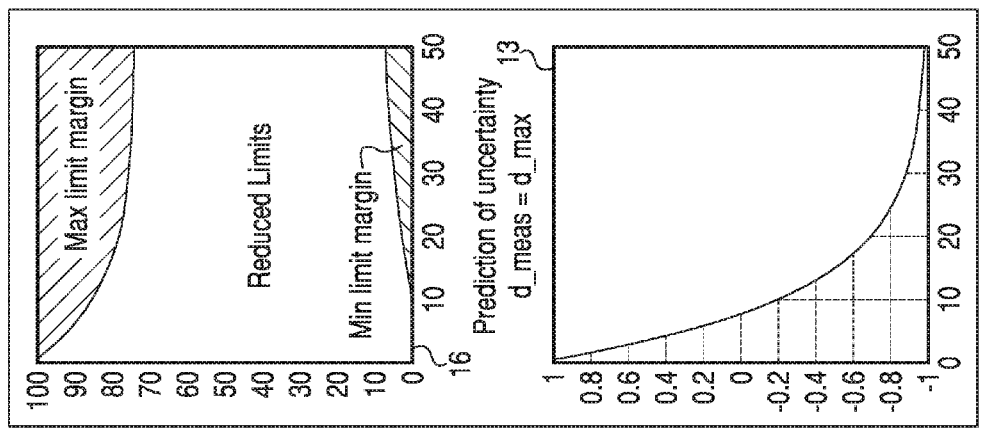
FIGS. 2a, 2b and 2c are diagrams of graphs having upper portions indicating a maximum limit margin, middle portions indicating reduced feasible limits and lower portions indicating a minimum limit margin.
Figure 2B:
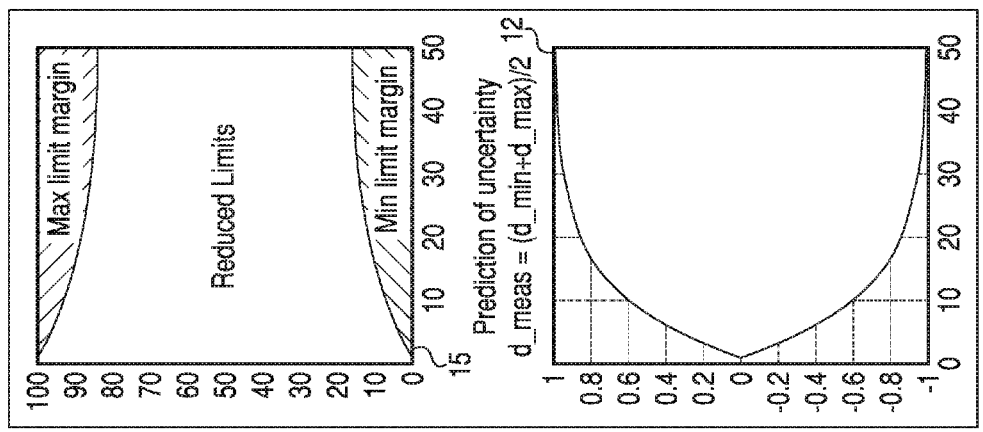
Figure 2C:
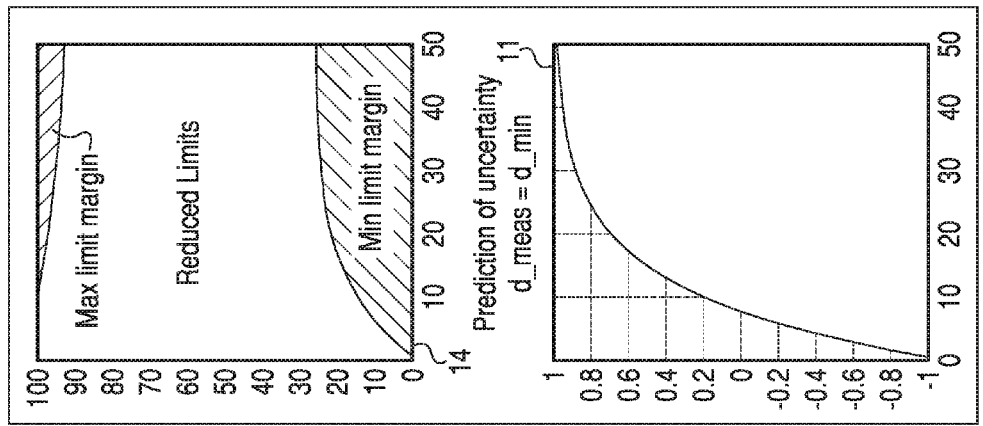

An example may be shown by diagrams of FIGS. 2a, 2b and 2c revealing graphs 14, 15 and 16. An upper portion of the graphs indicates a max limit margin. A middle portion of the graphs indicates feasible reduced limits and a lower portion indicates min limit margin. Graphs 14, 15 and 16 may relate to graphs 11, 12 and 13, respectively.

Items, such as requirements and limitations, relative to implementation of robust constraints handling may be noted.

An uncertain disturbance variable (DV) and scheduled variable (SV) specification may be noted. An uncertainty specification may be done on a "Controller Configuration" page of area 21 as revealed by a screen print 20 of a diagram in FIG. 5. Uncertainty may be configured for just exogenous or scheduled. variables as shown in a tree area 22. Uncertainty may be defined by a range and time constant as indicated in area 23.

Figure 6:
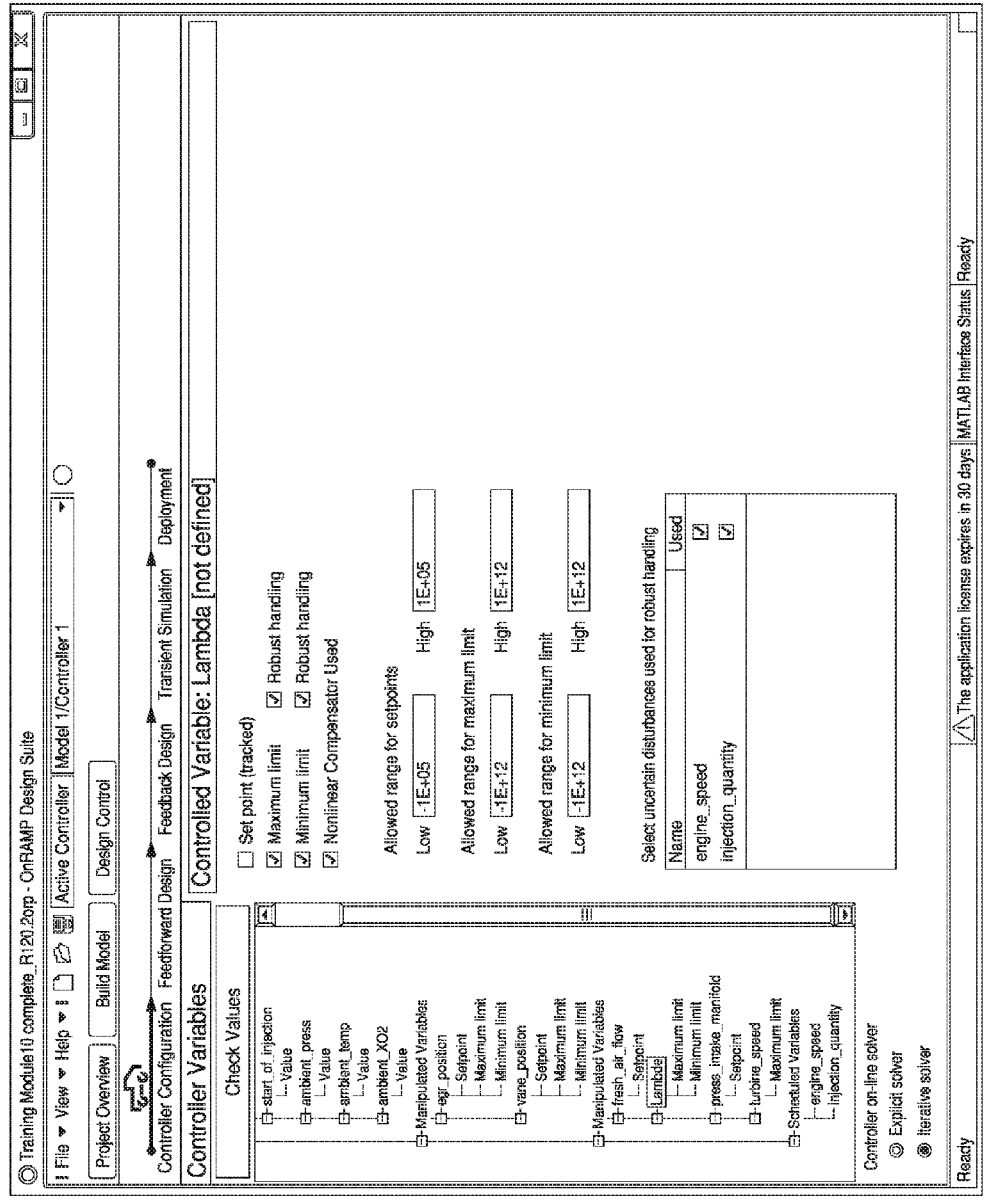
FIG. 6 is a diagram of a screen for configuring limits of selected controlled variables.

A configuration for robust handling of limits may be illustrated with a screen print 24 in a diagram of FIG. 6. A robust handling of limits may be defined on a "Controller Configuration" page as in screen print 24. A minimum! maximum limit of any "Controlled Variable" may be handled as robust. A user may select uncertain disturbance variables that are used for limit robust handling.

Figure 7:
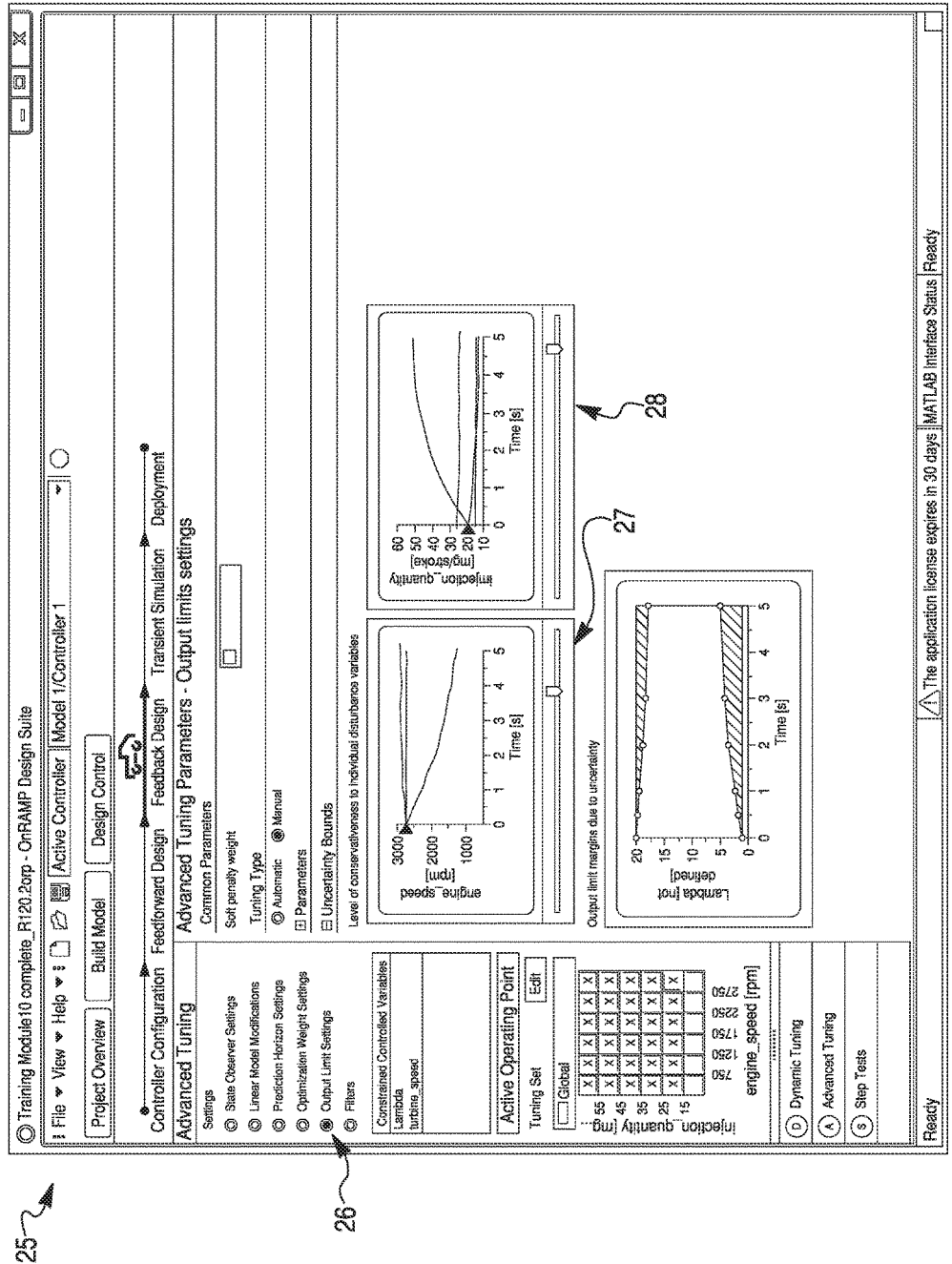
FIG. 7 is a diagram of a screen for aiding a tuning of handling limits of variables.

A tuning of a robust handling of limits may be aided by a screen print 25 of a diagram in FIG. 7. Robust constraints may be tuned on an "Advanced Tuning" of "Feedback Design" page as indicated in screen print 25. The tuning parameter may be a "Level of Conservativeness". Robust limit margins may be visualized based on user specified values, as revealed in areas 26, 27 and 28 of screen print 25.

Figure 8C:
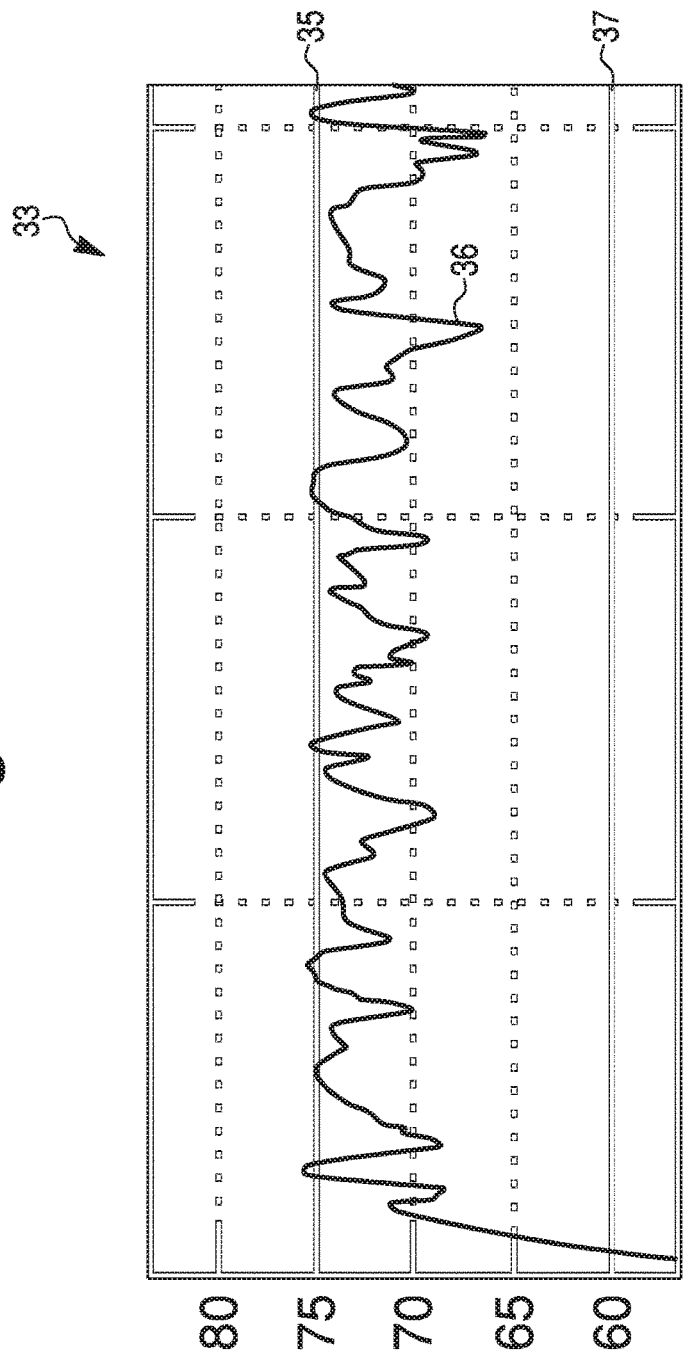

FIGS. 8a, 8b and 8c are diagrams of graphs 31, 32 and 33. Graph 31 represents a nominal case without robust constraints. Graph 32 represents balanced tuning for robust constraints. Graph 33 represents conservative tuning for robust constraints. Line 35 indicates a max limit=setpoint, waveform 36 indicates an actual value, and line 37 indicates a min limit.

To recap, a robust constraints handling system may incorporate a mechanism. for measuring disturbances of automotive control subsystems, a model predictive controller that provides model predictive control, connected to the a mechanism for measuring disturbances, and a sensor subsystem that collects information about an uncertainty of measured disturbances. The disturbances may have an uncertain preview over a prediction horizon. Estimates for the disturbances may be made of the preview over the prediction horizon.

The model predictive controller may control multivariable systems under nominal conditions having no uncertainties.

The best performance of constraints handling of the model predictive controller may be with true predicted future trajectories of one or more disturbance variables for each subsystem of the engine Improved performance of constraints handling of the model predictive controller may be from increased estimates of an. expected uncertainty range of the disturbance variables over a prediction horizon of the model predictive controller.

An uncertainty of a selected measured disturbance variable ay be approximated on the prediction horizon. Original prescribed limits on the prediction horizon may be reduced and in turn a probability of exceeding the original prescribed limits may be decreased.

The model predictive controller may be of one or more vehicle subsystems where handling of constraints is made in a presence of one or more measured disturbances having an uncertain prediction, the prediction being critical for operation of the one or more vehicle subsystems.

The model predictive controller may b hosted in an embedded control unit of an engine.

One or more measured disturbance variables having an uncertain preview over the prediction horizon may be selected from a group incorporating vehicle speeds, pedal position of fuel control by a driver, driver's torque requests, driver's aggressive tip-ins, sudden vehicle accelerations, exhaust gas flow, ambient conditions, and so forth.

One or more vehicle subsystems may be selected from a group incorporating thermal management, fuel injection, diesel oxidation catalyst control, diesel particulate filter control, aftertreatment, turbocharger, air path of an engine, and so forth.

A system for robust constraints handling for systems with measured disturbances. may incorporate a vehicle having an engine, one or more subsystems associated with the engine, and a model predictive controller that provides model predictive control for the one or more subsystems.

The one or more subsystems may have controlled variables to be maintained within limits by the model predictive controller. The vehicle may have disturbance variables that have uncertainties. An expected uncertainty range of the disturbance variables over a prediction horizon of the model predictive control may be estimated. An algorithm in the model predictive controller may approximate uncertainties of selected variables on the prediction horizon, in which original prescribed limits on the prediction horizon are reduced relative to a worst case of a combination of values of disturbance variables to which a probability of exceeding the original prescribed limits is decreased.

The algorithm may provide robust constraints handling in a presence of measured disturbances of the selected variables having uncertain prediction as needed to improve operation of the one or more subsystems.

The algorithm may be a computer program in a controller as hosted on a control unit of the vehicle.

An approach for handling constraints robustly for systems with measured disturbances, may incorporate controlling one or more subsystems of an engine with model predictive control, obtaining information about uncertainties of disturbance variables that are measured, previewing uncertainties of disturbance variables of the one or more subsystems over a prediction horizon in the model predictive control, using model predictive control to control subsystems under conditions in absence of the uncertainties, achieving best performance of the model predictive control when future trajectories of disturbance variables are predicted for the one or more subsystems, estimating an uncertainty range of disturbance variables over a prediction horizon of the model predictive control, handling constraints in view of disturbance variables that are measured and have uncertainties over the prediction horizon, and improving handling of the constraints of the disturbance variables by approximating uncertainties of the disturbance variables on the prediction horizon, and thus reducing original limits of the disturbance variables on the prediction horizon.

Reducing the original prescribed limits on the prediction horizon for the disturbance values may decrease a probability of violating the original limits of the disturbance variables.

Developing an algorithm in the model predictive controller that approximates uncertainties of selected variables on the prediction horizon, in which original prescribed limits on the prediction horizon are reduced relative to a worst case of a combination of values of disturbance variables to which a probability of exceeding the original prescribed limits may be decreased.

A probability of violating the original limits of disturbance variables may be less for the model predictive control having the algorithm than a probability of violating the original limits of the disturbance variables for the model predictive control operating without the algorithm.

All publications and patents noted herein are incorporated by reference to the same extent as if each individual publication or patent was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An engine subsystem control system comprising:
   a mechanism for measuring disturbances variables of automotive control subsystems;
   a model predictive controller that provides model predictive control of the automotive control subsystems to achieve prescribed performance while maintaining controlled variables within prescribed limits based on measurements of the disturbance variables and the controlled variables, the model predictive controller is connected to the mechanism for measuring disturbance variables and is configured to receive values from the mechanism based on the measurements of the disturbance variables; and
   wherein:
   the disturbance variables are uncertain over a prediction horizon;
   the model predictive controller provides estimates of the disturbance variables over the prediction horizon;
   the model predictive controller adjusts a range between limits on the disturbance variables based on the measurements of the disturbance variables-during operation of the automotive control subsystems; and
   the model predictive controller adjusts automotive control subsystem operations to achieve the prescribed performance based on the adjusted range between limits on the disturbance variables.

2. The system of claim 1, wherein the model predictive controller controls multivariable systems under nominal conditions.

3. The system of claim 1, wherein an uncertainty of a selected measured disturbance variable is approximated on the prediction horizon.

4. The system of claim 1, the model predictive controller is of one or more vehicle subsystems where handling of constraints is made in a presence of one or more measured disturbance variables having an uncertain prediction.

5. The system of claim 1, wherein the model predictive controller is hosted in an embedded control unit of an engine.

6. The system of claim 1, wherein one or more measured disturbance variables having an uncertain preview over the prediction horizon are selected from a group comprising vehicle speeds, pedal position of fuel control by a driver, driver's torque requests, driver's aggressive tip-ins, sudden vehicle accelerations, exhaust gas flow, and ambient conditions.

7. The system of claim 4, where one or more vehicle subsystems are selected from a group comprising thermal management, fuel injection, diesel oxidation catalyst control, diesel particulate filter control, aftertreatment, turbocharger, and air path of an engine.

8. A system for controlling subsystems of an engine, comprising:
   a vehicle having an engine;
   one or more subsystems associated with the engine; and
   a model predictive controller that provides model predictive control for the one or more subsystems to achieve prescribed performance while maintaining controlled variables within prescribed limits based on disturbance variables of the vehicle and the controlled variables; and
   wherein:
   the one or more subsystems have controlled variables to be maintained within a range of limits by the model predictive controller;
   the disturbance variables have uncertainties;
   the model predictive controller approximates uncertainties of selected disturbance variables on the prediction horizon and reduces an original prescribed range between limits on the selected disturbance variables over the prediction horizon based on measurements of the disturbance variables during operation of the vehicles; and
   the model predictive controller controls operation of the one or more subsystems associated with the engine based on the reduced range between limits for the selected variables.

9. The system of claim 8, wherein the algorithm provides robust constraints handling in a presence of measured disturbances of the selected variables having uncertainties.

10. The system of claim 8, wherein the algorithm is a computer program in a controller as hosted on a control unit of the vehicle.

11. A method for controlling subsystems of an engine, comprising:
    controlling one or more subsystems of an engine with model predictive controller to achieve prescribed performance while maintaining controlled variables within prescribed limits based on disturbance variables and the controlled variables;
    previewing uncertainties of disturbance variables of the one or more control subsystems over a prediction horizon in the model predictive controller;
    using the model predictive controller to adjust the one or more control subsystems based the disturbance variables of the control subsystems under conditions having initial constraints in an absence of the uncertainties of the disturbance variables over the prediction horizon;
    estimating an uncertainty range of the disturbance variables over the prediction horizon with the model predictive controller when the disturbance variables have uncertainties over the prediction horizon;

offsetting the constraints of the disturbance variables by approximating uncertainties of the disturbance variables on the prediction horizon based on measurements of the disturbance variables during operation of the engine, and thus reducing an original range between limits on the disturbance variables on the prediction horizon; and adjusting, with the model predictive controller, the one or more control subsystems based on the offset constraints of the disturbance variables.

12. The method of claim 11, wherein reducing the original prescribed range of limits on the prediction horizon for the disturbance values decreases a probability of violating the original range of limits of the disturbance variables.

13. The method of claim 11, wherein:

developing an algorithm in the model predictive controller that approximates uncertainties of selected variables on the prediction horizon, in which original prescribed range of limits on the prediction horizon are reduced; and a probability of violating the original range of limits of disturbance variables is less for the model predictive control having the algorithm than a probability of violating the original limits of the disturbance variables for the model predictive control operating without the algorithm.

* * * * *